(12) United States Patent
Ito

(10) Patent No.: US 8,305,451 B2
(45) Date of Patent: Nov. 6, 2012

(54) ADAPTER APPARATUS AND CONTROL METHOD THEREOF, AND COMPUTER PROGRAM

(75) Inventor: Kan Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1223 days.

(21) Appl. No.: 12/114,529

(22) Filed: May 2, 2008

(65) Prior Publication Data

US 2008/0297836 A1    Dec. 4, 2008

(30) Foreign Application Priority Data

May 29, 2007  (JP) .................................. 2007-142326

(51) Int. Cl.
*H04N 5/225* (2006.01)
(52) U.S. Cl. ...................................................... 348/207.1
(58) Field of Classification Search ............. 348/207.99, 348/207.1, 207.11, 207.2, 211.1, 211.4, 211.8, 348/211.14, 375; 725/105
See application file for complete search history.

(56) References Cited

U.S. PATENT DOCUMENTS

| | | | | |
|---|---|---|---|---|
| 7,167,206 | B2 * | 1/2007 | Kayanuma | 348/375 |
| 7,389,039 | B2 * | 6/2008 | Lee | 386/248 |
| 7,417,685 | B2 * | 8/2008 | Tsuji | 348/375 |
| 7,464,215 | B2 * | 12/2008 | Kawai | 710/303 |
| 2003/0011702 | A1 * | 1/2003 | Ohmura et al. | 348/372 |
| 2003/0117499 | A1 * | 6/2003 | Bianchi et al. | 348/211.2 |
| 2006/0013562 | A1 * | 1/2006 | Sugino et al. | 386/95 |
| 2006/0280488 | A1 * | 12/2006 | Tanabe | 386/126 |
| 2008/0055419 | A1 * | 3/2008 | Ito | 348/207.99 |
| 2008/0297836 | A1 * | 12/2008 | Ito | 358/1.15 |
| 2009/0046992 | A1 * | 2/2009 | Kitagawa | 386/95 |
| 2009/0073819 | A1 * | 3/2009 | Okumura | 369/30.04 |
| 2011/0169967 | A1 * | 7/2011 | Senda | 348/207.1 |

FOREIGN PATENT DOCUMENTS

| | | |
|---|---|---|
| JP | 2004-022043 | 1/2004 |
| JP | 2007-028595 A | 2/2007 |
| JP | 2007-066456 A | 3/2007 |
| JP | 2007-115379 A | 5/2007 |

OTHER PUBLICATIONS

The above references were cited in a Jul. 1, 2011 Japanese Office Action, which is enclosed without English Translation, that issued in Japanese Patent Application No. 2007-142326.

* cited by examiner

*Primary Examiner* — Aung S Moe
(74) *Attorney, Agent, or Firm* — Cowan, Liebowitz & Latman, P.C.

(57) ABSTRACT

Media data, which includes an image file recorded on a disk recording medium of a connected image sensing apparatus, management information including the recording position of the image file on the disk recording medium, and backup information of the management information, is received from the image sensing apparatus. Finalize processing of the disk recording medium is virtually executed using the received media data, and a generated disk image is stored on a memory. In response to a request from a data receiving terminal, the media data of the virtual disk image on the memory is transmitted to the data receiving terminal via a communication unit.

4 Claims, 7 Drawing Sheets

ADAPTER APPARATUS AND CONTROL METHOD THEREOF, AND COMPUTER PROGRAM

BACKGROUND OF THE INVENTION

1. Field of the Invention

The present invention relates to an adapter apparatus which distributes media data recorded on a disk recording medium of an image sensing apparatus to a data receiving terminal on a network and a control method thereof, and a computer program.

2. Description of the Related Art

In recent years, in the field of digital video cameras, those which record moving and still images using optical disks such as DVDs and the like as recording media (to be referred to as disk recording media hereinafter) in place of tapes have become mainstream. When a DVD is used as a disk recording medium, the DVD-Video format which has high compatibility to general DVD players is available as the recording format. As another recording format, for example, the DVD-VR format which allows easy editing of recorded images is known, although some general DVD player models cannot play back this format. The user selectively uses these recording formats depending upon application purposes.

Recently, a technical specification called DLNA has been established so as to connect digital AV apparatuses and personal computers to each other and to use data of moving images, music, and still images in a home network. Note that "DLNA" is an abbreviation for Digital Living Network Alliance.

In the DLNA guideline, a server for providing contents is called a DMS (digital media server), and a client that plays back contents is called a DMP (digital media player). The DLNA guideline specifies the connection conditions of these apparatuses. The apparatuses compatible to this DLNA guideline can be connected to each other by merely connecting a cable without any special settings, and can share their contents (moving image, music, still image files, and the like).

For example, when a camera such as a digital camera, DVD video camera, or the like is connected to a camera adapter with a DMS function, contents recorded on a recording medium of that camera are accessed via a LAN, and a network media player as a DMP plays back these contents. In this case, in order to distribute media data (moving or still image files or the like) on a disk recording medium via the LAN, the media data recorded on the disk recording medium needs to be accessible by the network media player.

In order to set the media data in an accessible state, the media data needs to be converted into a data sequence that can be played back by a general DVD player, and then to a UDF file system format as a data sequence compatible to a DVD-ROM as a read-only medium. Such series of processes are called finalize processing (for example, Japanese Patent Laid-Open No. 2004-22043). Nowadays, most apparatuses which handle optical disks maintain compatibility by executing this finalize processing.

FIG. 7 shows a data sequence in the DVD-Video format.

An optical disk is divided, from the head of its inner side, into a PMA (Programmable Memory Area), lead-in, data area, and lead-out. Moving image files and the like are recorded in the data area. The data area is divided, from the lead-in side, a UDF-Bridge file system (to be referred to as UDF) area, VMG (Video Manager) area (disk control information), and video data recording area.

The UDF and VMG areas are control information recording areas for managing files including video data recorded on an optical disk. The VMG area is an area that records information for a DVD player, and records control information used to manage whole video data recorded on the video data recording area. The UDF area records control information used to manage whole video data recorded in the video data recording area in a format compatible to a file system of an information apparatus (such as a personal computer (PC) or the like).

The video data recording area is a program area for recording actual video data, and uses a VTS (Video Title Set) as a unit to record video data including a plurality of VTS#1 to VTS#n. One VTS includes, from the head position, VTSI, a VTSM_VOBS, a VTSTT_VOBS, and a VTSI_BUP.

Note that the VTSI is an abbreviation for Video Title Set Information, and the VTSM_VOBS is an abbreviation for a Video Object Set for VTSM. Also, the VTSTT_VOBS is an abbreviation for Video Object Set for Titles in VTS, and the VTSI_BUP is an abbreviation for a Backup of VTSI.

The VTSI records recording position information or the like, which is title management information required to play back video data, and information required to manage video data. The VTSM_VOBS records title menus of video data. The VTSTT_VOBS records moving image files in the MPEG2PS format as real data of video data. The VTSI_BUP is backup information of the VTSI.

When an information apparatus such as a PC or the like accesses an optical disk recorded using such format, it can search for required files with reference to the UDF area and can play back that disk. On the other hand, when a DVD player accesses that optical disk, it can search for required files with reference to the VMG area, and can play back those files.

However, as described above, when a moving or still image file sensed by a DVD video camera is to be played back by the network media player via a home LAN, the sensed moving or still image file does not undergo the finalize processing. For this reason, the network media player cannot access the moving or still image file recorded on a DVD disk of the DVD video camera.

In order to execute the finalize processing, target data needs to be converted into a data sequence that can be played back by a general DVD player, and also into the UDF file system format as a data sequence compatible to a DVD-ROM as a read-only medium. In order to maintain full compatibility, even when the amount of recording data is small, dummy data up to about 1 GB needs to be recorded on a DVD disk, and this requires a considerably long processing time. Furthermore, in order to additionally record data on an optical disk on which data has already been recorded, processing for canceling the finalize process is required, resulting in troublesome operations.

When a write-once disk recording medium such as a DVD-R or the like is used as an optical disk used in recording, if that disk recording medium undergoes the finalize processing, additional recording cannot be made if that medium has a large remaining recording capacity.

SUMMARY OF THE INVENTION

The present invention has been made to solve the aforementioned problems, and has as its object to allow a media player on a network to quickly play back media data even before finalize processing for a disk recording medium of a DVD video camera, which records that media data. This object is achieved by providing an adapter apparatus which connects the DVD video camera and a control method thereof, and a computer program.

According to the first aspect of the present invention, an adapter apparatus, which connects an image sensing apparatus that comprises a disk recording unit for recording data on a disk recording medium, and distributes data recorded on the disk recording medium of the image sensing apparatus to a data receiving terminal on a network, the apparatus comprising:

communication means for communicating with the data receiving terminal on the network;

detection means for detecting connection of the image sensing apparatus;

reception means for, when the detection means detects the image sensing apparatus, receiving an image file recorded on the disk recording medium of the image sensing apparatus, and management information associated with the image file;

a memory for storing the image file and the management information;

finalize processing means for executing finalize processing of the disk recording medium using the data stored in the memory, and storing the finalized data on the memory; and transmission means for transmitting the data on the memory to the data receiving terminal via the communication means in response to a request from the data receiving terminal.

In a preferred embodiment, the finalize processing means requests the image sensing apparatus to transfer control information for a file management system by a computer, and control information for a file management system of a DVD-Video format, and executes the finalize processing based on the transferred control information.

In a preferred embodiment, the apparatus further comprises execution instruction transmission means for transmitting an execution instruction of the finalize processing of the disk recording medium of the image sensing apparatus to the image sensing apparatus.

According to the second aspect of the present invention, the method of controlling an adapter apparatus, which connects an image sensing apparatus that comprises a disk recording unit for recording data on a disk recording medium, and distributes data recorded on the disk recording medium of the image sensing apparatus to a data receiving terminal on a network, the method comprising:

a detection step of controlling detection means to detect connection of the image sensing apparatus;

a reception step of controlling reception means to receive, when the image sensing apparatus is detected in the detection step, an image file recorded on the disk recording medium of the image sensing apparatus, and management information associated with the image file;

a storage step of controlling a memory to store the image file and the management information;

a finalize processing step of controlling finalize processing means to execute finalize processing of the disk recording medium using the data stored in the memory, and to store the finalized data on the memory; and a transmission step of controlling transmission means to transmit the data on the memory to the data receiving terminal in response to a request from the data receiving terminal.

According to the third aspect of the present invention, the computer program stored in a computer-readable medium to make a computer execute control of an adapter apparatus, which connects an image sensing apparatus that comprises a disk recording unit for recording data on a disk recording medium, and distributes data recorded on the disk recording medium of the image sensing apparatus to a data receiving terminal on a network, the program comprising:

a detection step of detecting connection of the image sensing apparatus;

a reception step of receiving, when the image sensing apparatus is detected in the detection step, an image file recorded on the disk recording medium of the image sensing apparatus, and management information associated with the image file;

a storage step of storing the image file and the management information in a memory;

a finalize processing step of executing finalize processing of the disk recording medium using the data stored in the memory, and storing the finalized data on the memory; and a transmission step of transmitting the data on the memory to the data receiving terminal in response to a request from the data receiving terminal.

According to the fourth aspect of the present invention, an information processing apparatus, which connects an image sensing apparatus that comprises a disk recording unit for recording data on a disk recording medium, and stores the data recorded on the disk recording medium of the image sensing apparatus, the apparatus comprising:

detection means for detecting connection of the image sensing apparatus;

reception means for, when the detection means detects the image sensing apparatus, receiving an image file recorded on the disk recording medium of the image sensing apparatus, and management information associated with the image file;

a memory for storing the image file and the management information; and finalize processing means for executing finalize processing of the disk recording medium using the data stored in the memory, and storing the finalized data on the memory.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that image files (moving or still image files) and audio files used in the following description will be generically referred to as media data hereinafter.

Figure 1:
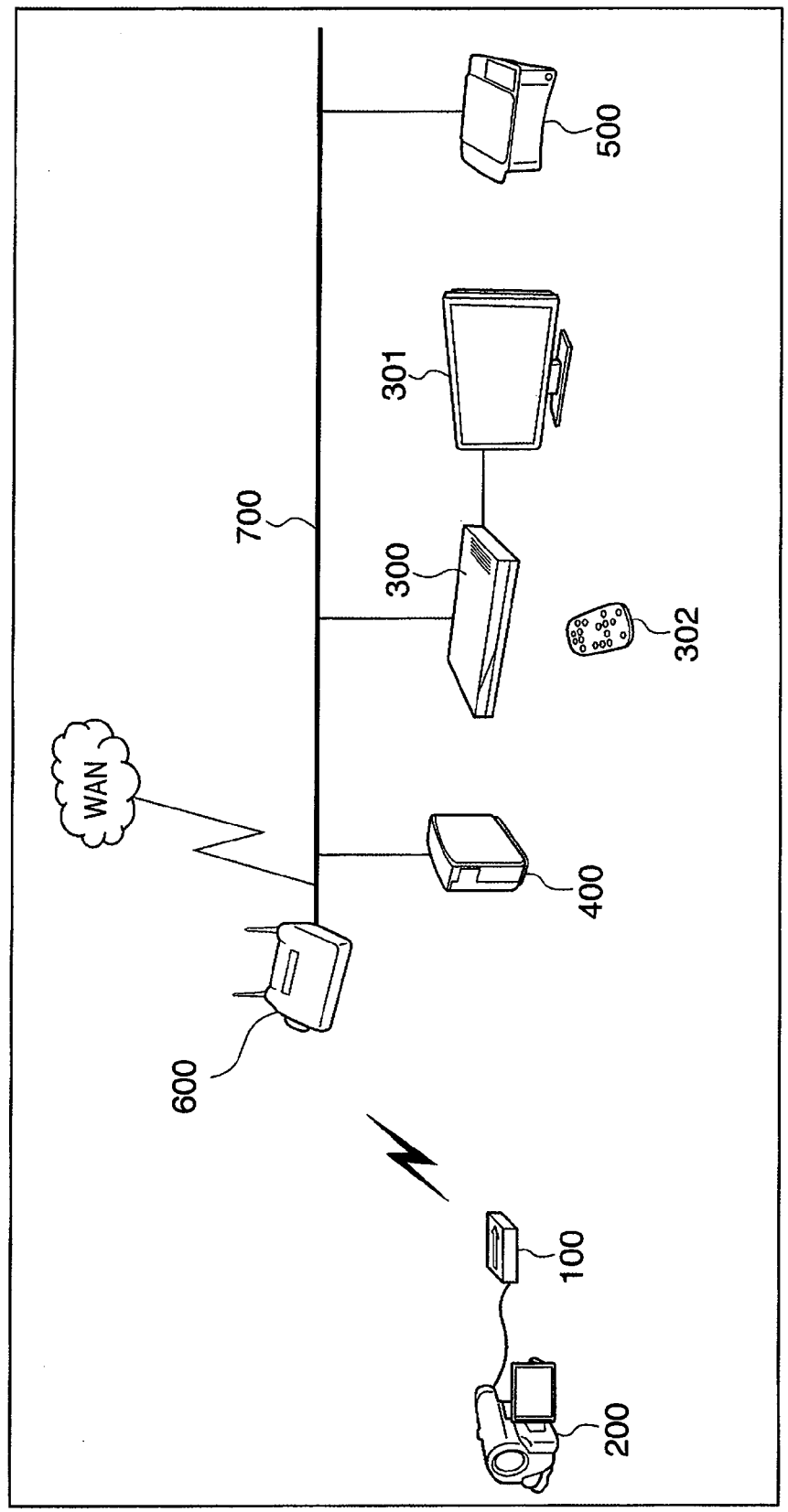
FIG. 1 is a view showing the configuration of network connections of a media data distribution system according to an embodiment of the present invention.

FIG. 1 is a view showing the configuration of network connections of a media data distribution system according to an embodiment of the present invention.

In the media data distribution system, a DVD video camera 200, camera adapter 100, display adapter terminal 300, display 301, storage server 400, and printer terminal 500 are connected to each other via a home LAN 700.

Note that the DVD video camera 200 serves as an image sensing apparatus which comprises a disk recording unit that records media data on a disk recording medium.

The user usually brings out the DVD video camera 200 by attaching a battery to it and senses moving or still images when he or she leaves home. Then, the user connects the DVD video camera 200 to the camera adapter 100 when he or she comes home. The camera adapter 100 can distribute sensed images of the DVD video camera 200 to the display adapter terminal 300 via a wireless access point 600 as a moving image stream in real time. Also, the camera adapter 100 can distribute media data recorded on an optical disk (DVD-R, DVD-RW, or the like) by the DVD video camera 200 to the display adapter terminal 300 via the wireless access point 600.

The wireless access point 600 makes wireless communications with the camera adapter 100 to medicate connection to the LAN 700 as a packet communication network. A remote controller 302 allows the user to operate the display adapter terminal 300, and also to operate the camera adapter 100, to which the DVD video camera 200 is connected, via the LAN 700 and wireless access point 600.

The display adapter terminal 300 reads out media data recorded on the optical disk loaded in the DVD video camera 200, and receives them as data streams. Or the display adapter terminal 300 reads out media data stored in a memory of the camera adapter 100, and receives them as data streams. The display adapter terminal 300 reconstructs back images by decoding the received data streams (encoded in various formats), and displays the played-back images on the connected display 301.

The printer terminal 500 receives data streams of respective media data distributed from the DVD video camera 200 and camera adapter 100, and reconstructs and prints images by decoding the media data (encoded in various formats). The storage server 400 records sensed images of the DVD video camera 200 via the LAN 700, and comprises applications such as a digital album, moving image edit program, and the like, which are used to implement management, retrieval, and the like of images.

Details of the functions of the DVD video camera 200 and camera adapter 100 in the configuration of the media data distribution system will be described below.

Figure 2:
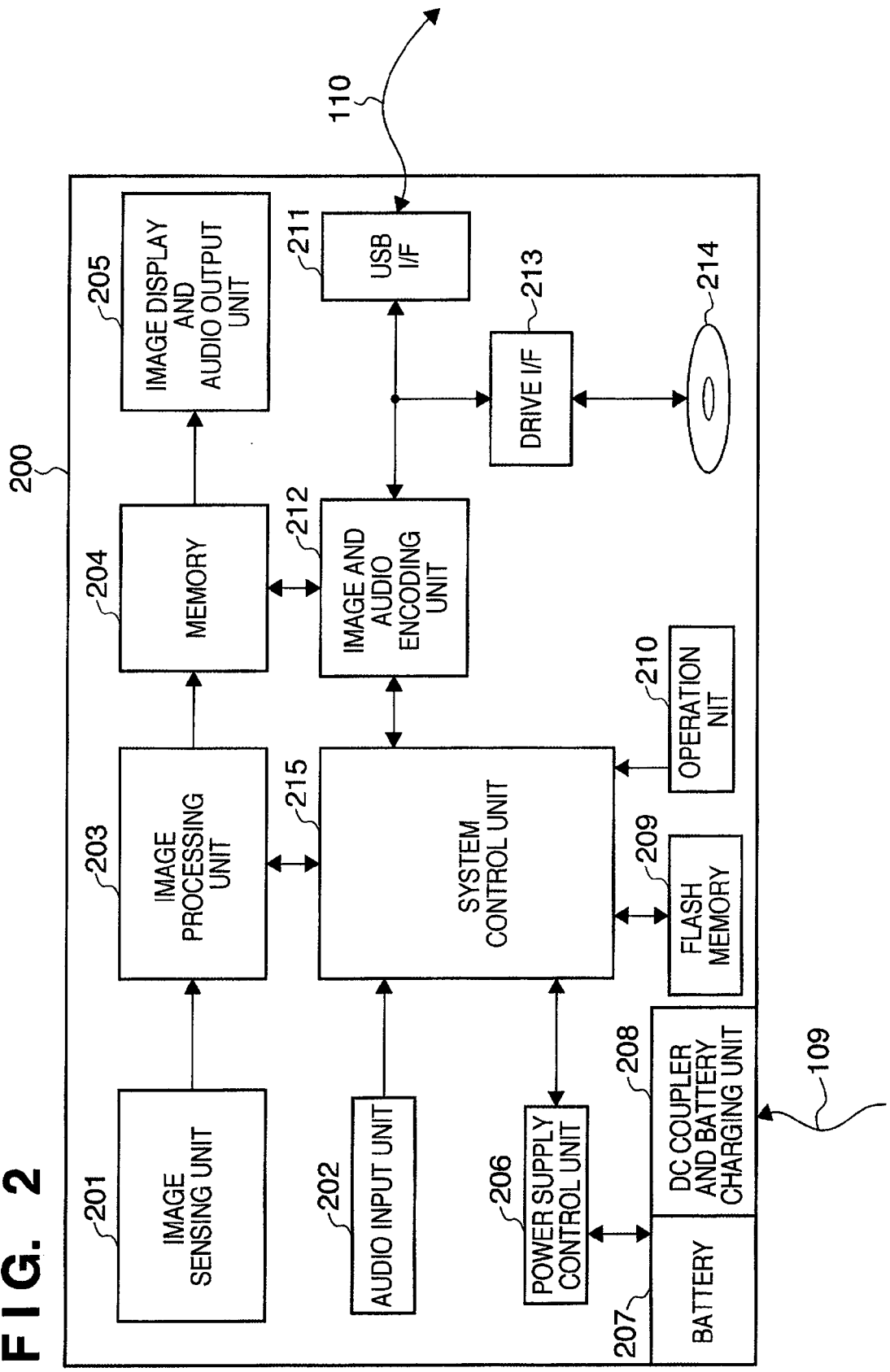
FIG. 2 is a block diagram showing details of the arrangement of a DVD video camera according to the embodiment of the present invention.

FIG. 2 is a block diagram showing details of the arrangement of the DVD video camera according to the embodiment of the present invention.

In the DVD video camera 200 shown in FIG. 2, an image sensing unit 201 applies signal processing to a signal photoelectrically converted by an image sensing element such as a CCD sensor, CMOS sensor, or the like, and outputs the processed signal to an image processing unit 203. The image processing unit 203 applies image processing such as pixel interpolation, color conversion processing, and the like to a digital image signal from the image sensing unit 201. The image processing unit 203 executes calculation processing using the digital image signal from the image sensing unit 201, and executes AF and AE processes based on a calculation result obtained from a system control unit 215. Furthermore, the image processing unit 203 calculates calculation processing using the digital image signal from the image sensing unit 201, and also executes TTL AWB processing based on the calculation result.

A memory 204 stores still images and moving images sensed by the image sensing unit 201. This memory 204 has a storage capacity large enough to store a predetermined number of still images and a moving image for a predetermined period of time. The memory 204 has a function as a memory used to display an image on and to output an audio to an image display and audio output unit 205.

The image display and audio output unit 205 comprises an image display unit such as a TFT, LCD, or the like, and an audio output unit such as a loudspeaker or the like, which are used to display and output display image data and audio data stored in the memory 204. Using this image display and audio output unit 205, sensed images are sequentially displayed to implement an electronic viewfinder function.

An image and audio encoding unit 212 receives the digital image signal of the Y, Cr/Cb format, and an audio signal input from an audio input unit 202. If the digital image signal is a moving image, the image and audio encoding unit 212 executes compression/decompression and multiplexing based on MPEG2 standard. If the digital image signal is a still image, the image and audio encoding unit 212 executes compression/decompression and multiplexing based on JPEG standard. The image and audio encoding unit 212 executes compression or decompression processing by loading video data and audio data stored in the memory 204, and writes the processed moving image, still image, and audio data in the memory 204 again.

The audio input unit 202 is used to record an audio or as an audio input upon sensing a moving image. The system control unit 215 controls various operations of the all DVD video camera 200. A flash memory 209 is an electrically erasable/recordable, nonvolatile memory, and stores management information associated with an optical disk 214.

An operation unit 210 comprises various buttons and a touch panel, and allows the user to make all settings associated with the image sensing functions of the DVD video camera 200 using a menu button, set button, arrow buttons, and the like. A power supply control unit 206 comprises a power supply detection circuit, a DC-DC converter, switch circuit for switching blocks to be energized, and the like. The power supply control unit 206 detects the presence/absence of attachment of a power supply (battery 207), the type of power supply, and the remaining amount of power supply, and supplies required voltages to various components of the DVD video camera 200 for required periods based on the detection result and an instruction from the system control unit 215.

The battery 207 comprises a secondary battery such as an NiCd battery, lithium-ion battery, or the like. A DC coupler and battery charging unit 208 receives power supply via a power supply cable 109 and feeds power to the battery 207 when the DVD video camera 200 is connected to the camera adapter 100.

A USB I/F 211 is a communication interface used to exchange media data and control data with the camera adapter 100. In this embodiment, a communication by means of a USB cable 110 is exemplified. However, such data may be exchanged by other communication methods such as IEEE1394 and the like. In this case, the USB I/F 211 is replaced by interfaces compatible to the communication standards to be adopted.

The optical disk 214 is a recording medium such as a DVD-R, DVD-RW, or the like. A sensed moving or still image file is written in this optical disk 214 via a drive I/F 213. The drive I/F 213 is a circuit for recording and playing back a moving or still image file, its management information, and the like on or from the optical disk 214. This drive I/F 213 includes an optical pickup and various motors such as a seek motor, spindle motor, and the like, which are required to record and play back data.

Figure 3:
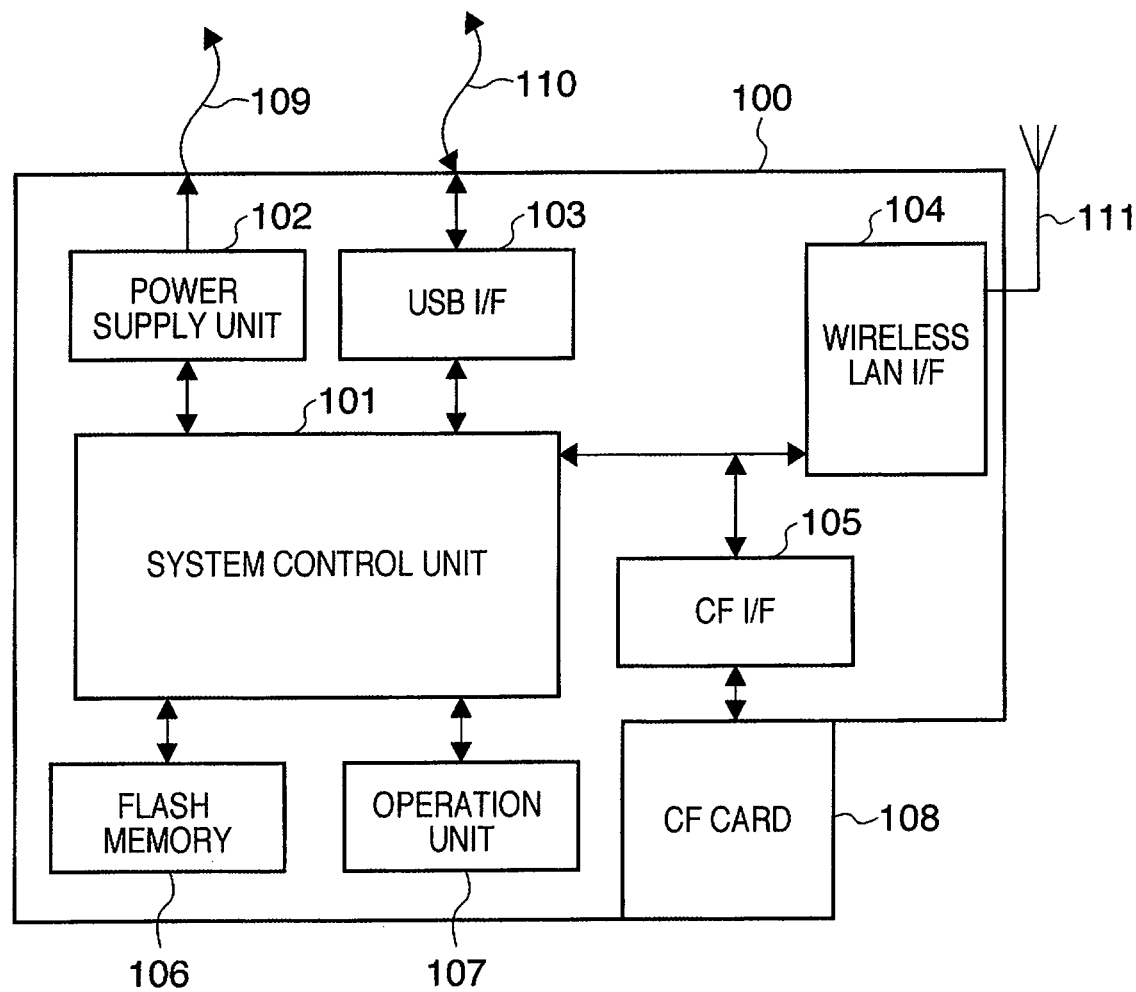
FIG. 3 is a block diagram showing details of the arrangement of a camera adapter according to the embodiment of the present invention.

FIG. 3 is a block diagram showing details of the arrangement of the camera adapter according to the embodiment of the present invention.

In the camera adapter 100 shown in FIG. 3, a power supply unit 102 supplies electric power via the power supply cable 109 when the DVD video camera 200 is connected to the camera adapter 100. When the DVD video camera 200 is connected to the camera adapter 100 while the battery 207 is attached to the camera 200, the power supply unit 102 supplies electric power to charge the battery 207.

A USB I/F 103 is a communication interface used to exchange media data and control data with the DVD video camera 200. A flash memory 106 is an electrically erasable/recordable, nonvolatile memory.

An operation unit 107 comprises various buttons and a touch panel. By operating the operation unit 107, the user can copy a moving or still image file on the optical disk 214 of the DVD video camera 200 to a CF card 108 of the camera adapter 100. By operating the operation unit 107, the user can transfer media data to the display adapter terminal 300 via a wireless LAN I/F 104, the wireless access point 600, and the LAN 700. In this way, by operating the operation unit 107, the user can start operations of various functions implemented by the camera adapter 100.

The CF card 108 is one type of recording media. On this CF card 108, a moving or still image sensed by the DVD video camera 200 is written via the USB I/F 103 and a CF I/F 105 as a communication using the USB cable 110. On the CF card 108, the written moving or still image file is developed to the UDF file management format accessible by an information terminal (computer) such as a PC or the like, and is mounted as a virtual disk drive (disk image). The moving or still image file on the mounted disk drive is transferred to the display adapter terminal 300 via the CF I/F 105, wireless LAN I/F 104, wireless access point 600, and LAN 700.

Note that other recording media such as an SD card, micro drive, and the like may be used in place of the CF card 108. In this case, the CF I/F 105 is replaced by interfaces compatible to the standards of respective recording media.

The wireless LAN I/F 104 accommodates a wireless communication with the wireless access point 600 using an antenna unit 111. A system control unit 101 controls the operation of the overall camera adapter 100, and detects and instructs respective components such as the power supply unit 102, USB I/F 103, CF I/F 105, and wireless LAN I/F 104.

Note that the number of terminals such as the camera adapter 100, wireless access point 600, display adapter terminal 300, printer terminal 500, storage server 400, and the like, which are connected to the LAN 700 is not limited to that shown in FIG. 1. The number of terminals is not particularly limited as long as various terminals on the LAN 700 can be identified by identification information such as IP addresses and the like.

In addition to the LAN 700, networks such as the Internet, intranet, and the like may be used as long as they are communication lines having frequency ranges enough to exchange media data and control data to be exchanged. As the display adapter terminal 300, for example, a PC, portable information terminals such as a portable phone, PDA, and the like, network compatible television, and the like are assumed. Therefore, as a physical connection mode to the LAN 700, not only a wired connection but also a wireless connection is available. However, if connection is established in terms of a protocol, a physical connection is not particularly limited.

The operation of the media data distribution system will be described below.

After the DVD video camera 200 is connected to the camera adapter 100, operations from the display adapter terminal 300, printer terminal 500, and storage server 400 which serve as data receiving terminals are made via the LAN 700. With these operations, a moving or still image file recorded on the optical disk 214 of the DVD video camera 200 can be displayed on the display adapter terminal 300, can be printed using the printer terminal 500, and can be stored in the storage server 400.

Assume that the optical disk 214 used in image sensing by the DVD video camera 200 uses a DVD-R or DVD-RW, and records a moving image in the DVD-Video format. The user operates a video recording start/stop switch to start and stop image sensing after he or she sets a video recording mode using a mode switch as one switch of the operation unit 210. The series of operations are those for one cut. Parallel to these operations, when the user presses a still image sensing button, he or she can take a still image at the same time.

After image sensing is stopped, when the user switches the mode switch to a playback mode, the image display and audio output unit 205 displays, in a menu, one file for each cut in case of a moving image, and for each image sensing in case of a still image. When the user presses select and play buttons, the selected moving or still image file is played back on the image display and audio output unit 205.

Note that either a DVD-R or DVD-RW is used as the optical disk 214 upon recording. Since the DVD-R is a write-once recording medium, video data are sequentially recorded. On the other hand, the DVD-RW is an overwritable recording medium. Upon recording video data on a non-recorded area of the DVD-RW, they are sequentially recorded.

The processing sequence upon recording video data on the DVD-R will be described below with reference to FIG. 4.

Figure 4:
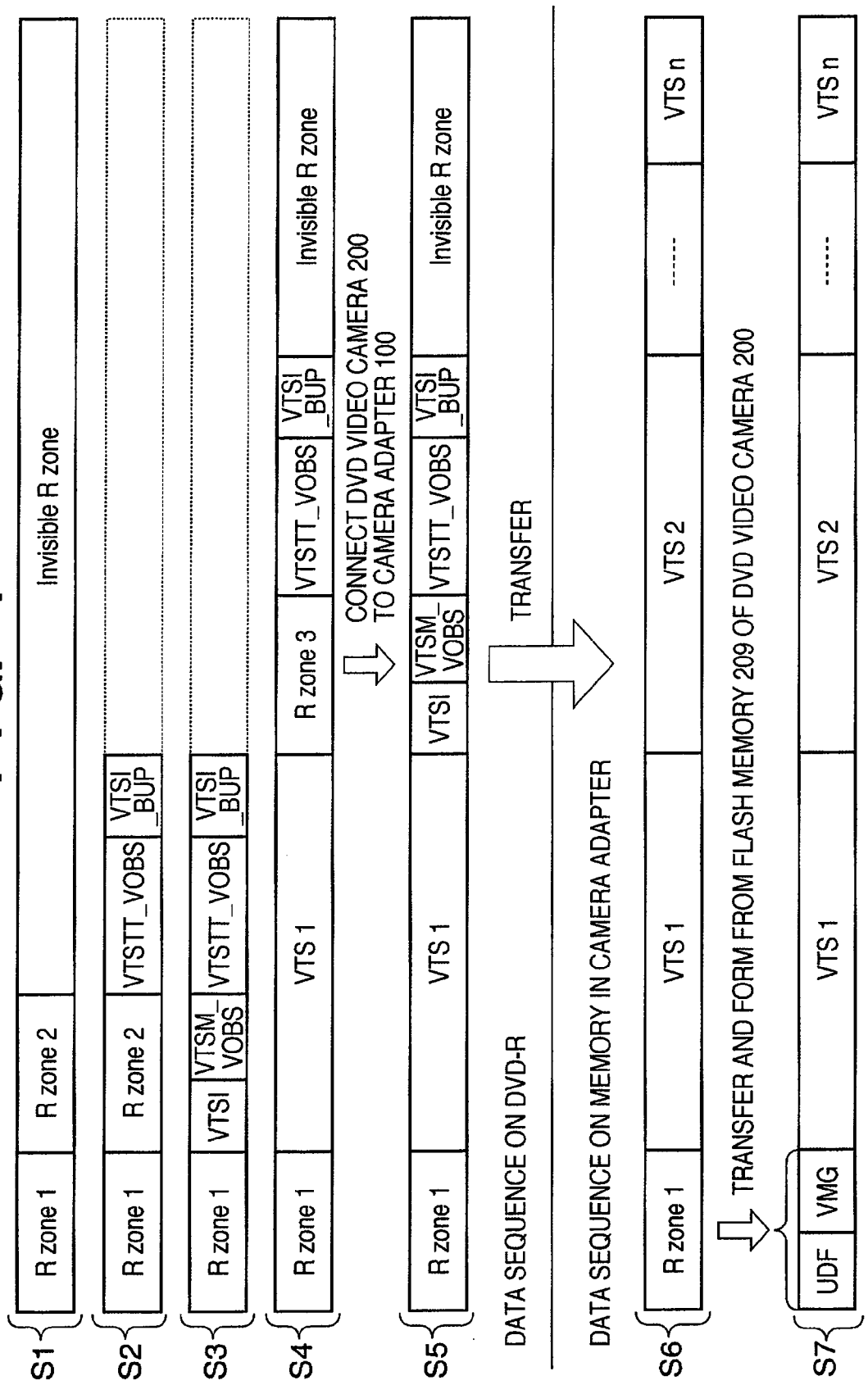
FIG. 4 is a view showing the processing sequence upon recording video data on a DVD-R according to the embodiment of the present invention.

FIG. 4 is a view showing the processing sequence upon recording video data on the DVD-R according to the embodiment of the present invention.

Figure 7:
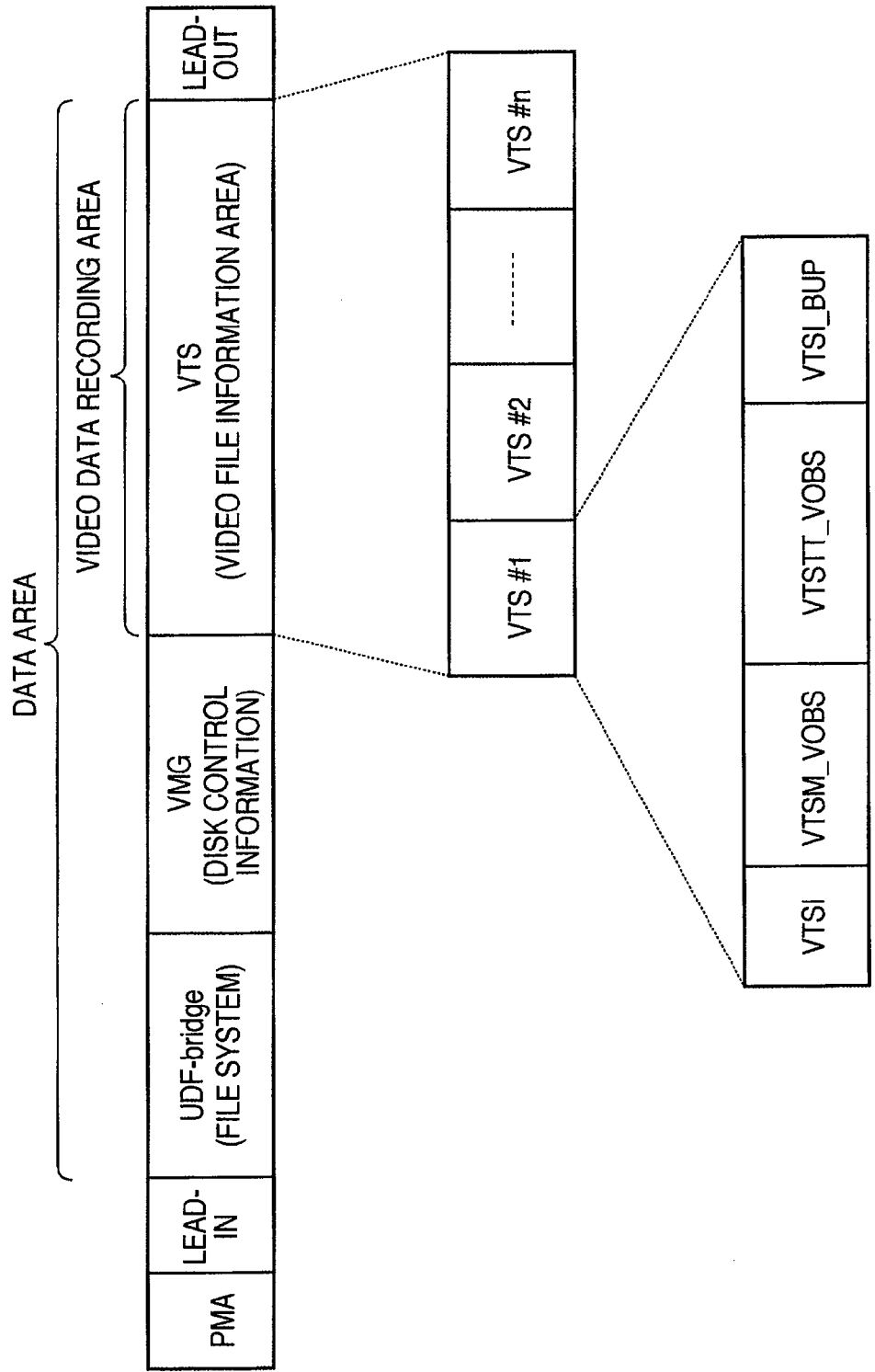
FIG. 7 shows the data sequence of the DVD-Video format.

Upon recording on the DVD-R, a maximum of three areas can be used to write data at the same time, and these areas are called R zones, which are managed by a PMA shown in FIG. 7. Upon recording moving image data, R zones are reserved first. The R zones are reserved as follows. That is, an area for R zone 1 where a UDF area as control information of a file management system in an information terminal such as a PC or the like, and a VMG area as control information for managing whole video data recorded in a video data recording area are formed is reserved. Also, R zone 2 where VTSI and a VTSM_VOBS of a first VTS are formed is reserved in a non-recorded area in the video data recording area. Furthermore, the remaining non-recorded area is reserved as an area of Invisible R zone (S1).

After that, video data is sequentially recorded from the head of the Invisible R zone, thus forming a VTSTT_VOBS as actual data of the video data. Furthermore, upon completion of recording of video data for one title in response to an operation from the operation unit 210 of the DVD video camera 200, a VTSI_BUP is recorded after the VTSTT_VOBS as actual data (S2). Returning to the head side, VTSI and a VTSM_VOBS are formed in R zone 2 (S3), thus closing R zone 2. In this way, one VTS1 is recorded on the DVD-R.

Upon recording the next title subsequently, R zone 3 is reserved in the remaining non-recorded area, and a VTST-T_VOBS as actual data of video data is then formed. After that, a VTSI_BUP is formed (S4). Upon completion of recording of video data for one title, VTSI and a VTSM_VOBS are similarly formed in R zone 3, thus forming a new VTS. In this manner, VTSs are sequentially recorded (S5).

When the data receiving terminal displays, prints, or stores video data recorded on the DVD-R via the LAN 700 in response to an operation from that data receiving terminal, the DVD video camera 200 is connected to the camera adapter 100 via the USB cable 110. The data receiving terminal in this case is the display adapter terminal 300, printer terminal 500, or storage server 400.

The operation sequence between the terminals when the DVD video camera 200 is connected to the camera adapter 100 and transfers video data to the display adapter terminal 300 will be described below with reference to FIG. 6.

Figure 6:
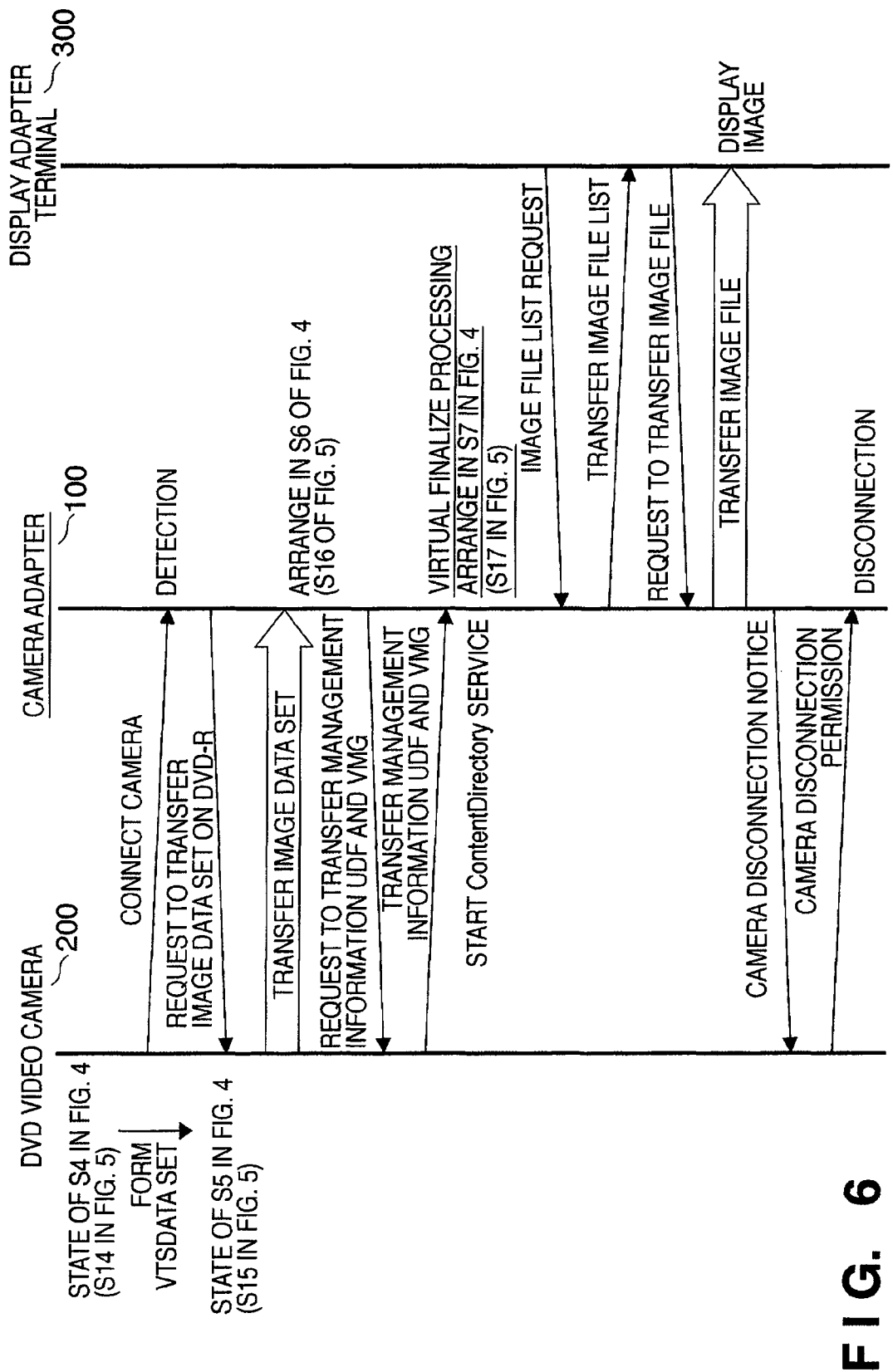
FIG. 6 is a chart showing the operation sequence among terminals when the DVD video camera according to the embodiment of the present invention is connected to the camera adapter, and video data is transferred to a display adapter terminal.

Note that FIG. 6 is used to explain the operation sequence until video data is transferred to the display adapter terminal 300. Also, when the transfer destination is the storage server 400 or the printer terminal 500, the same operation sequence can be applied.

The recorded state of the DVD-R at that time is the state of S4 in FIG. 4. The camera adapter 100 which is connected to the DVD video camera 200 via the USB cable 110 detects that connection via the USB I/F 103. Upon detection of connection to the DVD video camera 200, the camera adapter 100 requests the DVD video camera 200 to transfer an image data set on the DVD-R.

In response to this request, the DVD video camera 200 forms VTSI and a VTSM_VOBS on areas reserved on the DVD-R to form a data set of VTSs (S5 in FIG. 4). The UDF and VMG as management information associated with the DVD-R at that time are held in the flash memory 209. In this state, the DVD video camera 200 loads the data set via the drive I/F 213, and transfers the data set from the USB I/F 211 to the camera adapter 100 via the USB cable 110. The system control unit 101 of the camera adapter 100 writes the received data set in the CF card 108 (S6 in FIG. 4).

Upon completion of the write processing of the data set, the camera adapter 100 requests the DVD video camera 200 to transfer the UDF and VMG as the management information corresponding to the written data set.

In response to this request, the DVD video camera 200 transfers the UDF and VMG as the management information held in the flash memory 209 to the camera adapter 100. The system control unit 101 of the camera adapter 100 forms a data sequence (S7 in FIG. 4) on the CF card 108, and executes virtual finalize processing that virtually finalizes the DVD-R of the DVD video camera 200. As a result, the display adapter terminal 300 can access the data set as image files of the DVD-R, which has virtually undergone the finalize processing on the CF card 108 of the camera adapter 100.

The moving or still image files which are ready to be accessed in this way are converted into MPEG2PS files, and are displayed as a list based on a ContentDirectory service as the DMS function of the DLNA (to generate an image file list). Then, upon reception of an image file list request by an operation from the display adapter terminal 300, the camera adapter 100 transfers the image file list to the display terminal adapter 300.

Furthermore, upon reception of an image file transfer request based on the image file list from the display adapter terminal 300, the camera adapter 100 transfers the requested image file to the display adapter terminal 300.

In this way, the display adapter terminal is accessible to the image files on the CF card 108 of the camera adapter 100.

In order to sense images by the DVD video camera 200 again, the user operates the operation unit 107 of the camera adapter 100 to notify the DVD video camera 200 of disconnection from the camera adapter 100 and to get permission. In this way, the user disconnects the DVD video camera 200 from the camera adapter 100, and can record sensed images on the DVD-R from the state of S5 in FIG. 4 by the same sequence as described above.

The processing sequence upon recording video data on a DVD-RW will be described below with reference to FIG. 5.

Figure 5:
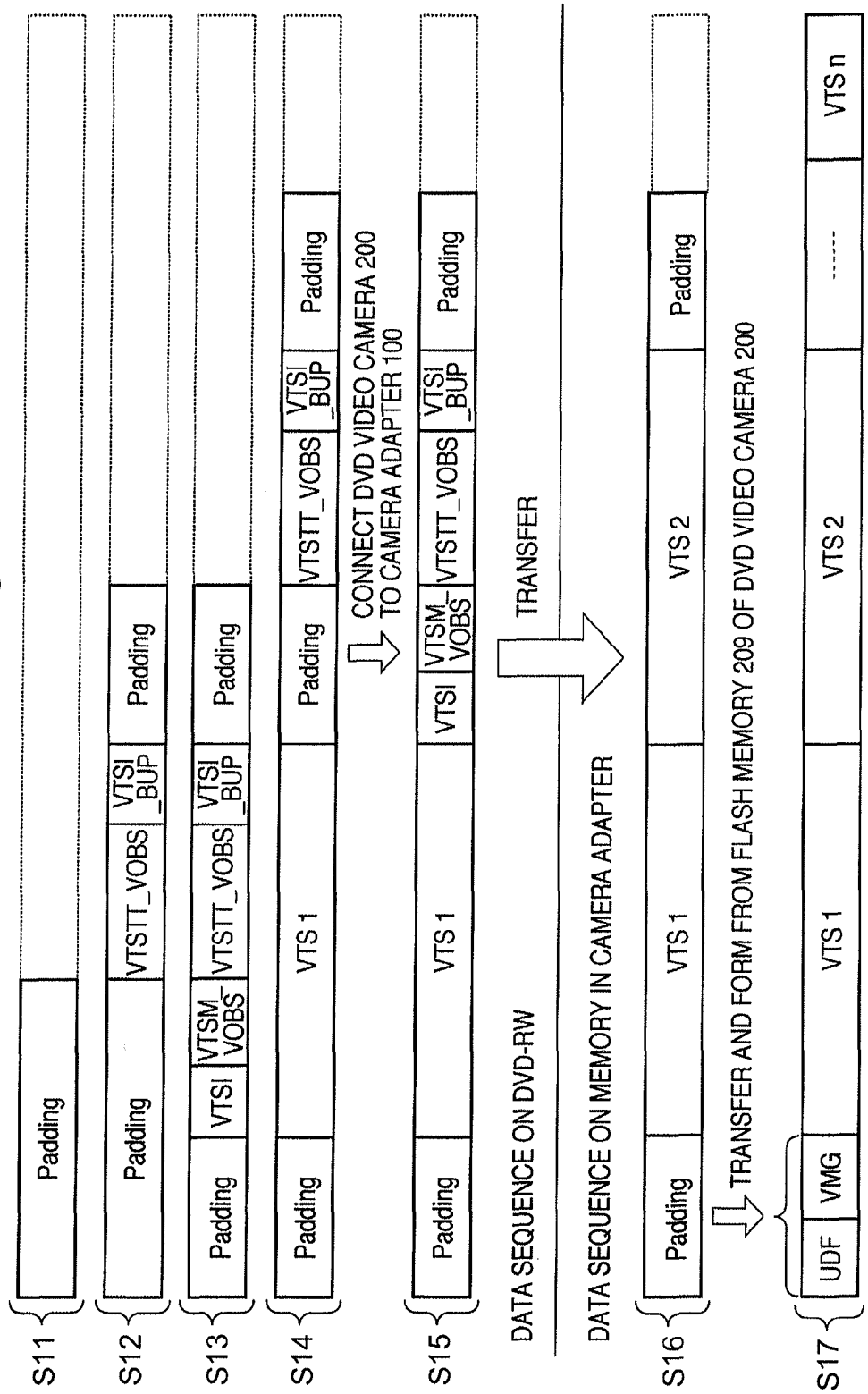
FIG. 5 is a view showing the processing sequence upon recording video data on a DVD-RW according to the embodiment of the present invention.

FIG. 5 is a view showing the processing sequence upon recording video data on a DVD-RW according to the embodiment of the present invention.

Upon recording on the DVD-RW, recording areas for a UDF and VMG, and VTSI and a VTSM_VOBS for the first title are assured in advance by Padding (S11 in FIG. 5). Note that "Padding" means assuring an area by recording dummy data. After these recording areas are assured, a VTST-T_VOBS as actual data of video data is formed. Upon completion of recording of video data for one title by an operation from the operation unit 210 of the DVD video camera 200, a VTSI_BUP is recorded after the VTST-T_VOBS as the actual data. Furthermore, recording areas for VTSI and a VTSM_VOBS for the subsequent title are assured by Padding (S12 in FIG. 5).

Returning to the head side, VTSI and a VTSM_VOBS corresponding to recording of this video data are formed (S13 in FIG. 15). In this way, one VTS is recorded on the DVD-RW.

Subsequently, upon recording video data for the next title, a VTSTT_VOBS as actual data of video data and VTSI_BUP are formed after the recording areas assured by Padding upon forming the immediately preceding VTS. Recording areas for VTSI and a VTSM_VOBS for the next title are assured by Padding (S14 in FIG. 5). After that, VTSI and a VTSM_VOBS are formed, thus similarly recording VTSs in turn (S15 in FIG. 5).

When the data receiving terminal displays, prints, or stores video data recorded on the DVD-RW via the LAN 700 in response to an operation from that data receiving terminal, the DVD video camera 200 and camera adapter 100 are connected via the USB cable 110. The data receiving terminal in this case is the display adapter terminal 300, printer terminal 500, or storage server 400.

The operation sequence between respective terminals when the DVD video camera 200 is connected to the camera adapter 100 and video data is transferred to the display adapter terminal 300 will be described below with reference to FIG. 6.

The recorded state of the DVD-RW at this time is the state of S14 in FIG. 5. The camera adapter 100 which is connected to the DVD video camera 200 via the USB cable 110 detects connection of the DVD video camera 200 by the USB I/F 211. Upon detection of connection to the DVD video camera 200, the camera adapter 100 requests the DVD video camera 200 to transfer an image data set on the DVD-RW.

In response to this request, the DVD video camera 200 forms VTSI and a VTSM_VOBS on a Padding area immediately before the VTSTT_VOBS as actual data of video data on the DVD-RW to form a data set of VTSs (S15 in FIG. 5). The UDF and VMG as management information associated with the DVD-RW at that time are held in the flash memory 209. In this state, the DVD video camera 200 loads the data set via the drive I/F 213, and transfers the data set from the USB I/F 211 to the camera adapter 100 via the USB cable 110. The system control unit 101 of the camera adapter 100 writes the received data set in the CF card 108 (S16 in FIG. 5).

Upon completion of the write processing of the data set, the camera adapter 100 requests the DVD video camera 200 to transfer the UDF and VMG as the management information corresponding to the written data set.

In response to this request, the DVD video camera 200 transfers the UDF and VMG as the management information held in the flash memory 209 to the camera adapter 100. The system control unit 101 of the camera adapter 100 forms a data sequence (S17 in FIG. 5) on the CF card 108, and executes virtual finalize processing that virtually finalizes the DVD-RW of the DVD video camera 200. As a result, the display adapter terminal 300 can access the data set as image files of the DVD-RW, which has virtually undergone the finalize processing on the CF card 108 of the camera adapter 100.

The moving or still image files which are ready to be accessed in this way are converted into MPEG2PS files, and are displayed as a list based on a ContentDirectory service as the DMS function of the DLNA (to generate an image file list). Then, upon reception of an image file list request by an operation from the display adapter terminal 300, the camera adapter 100 transfers the image file list to the display terminal adapter 300.

Furthermore, upon reception of an image file transfer request based on the image file list from the display adapter terminal 300, the camera adapter 100 transfers the requested image file to the display adapter terminal 300.

In this way, the display adapter terminal is accessible to the image files on the CF card 108 of the camera adapter 100.

In order to sense images by the DVD video camera 200 again, the user operates the operation unit 107 of the camera adapter 100 to notify the DVD video camera 200 of disconnection from the camera adapter 100 and to get permission. In this way, the user disconnects the DVD video camera 200 from the camera adapter 100, and can record sensed images on the DVD-RW from the state of S15 in FIG. 5 by the same sequence as described above.

With the aforementioned processing, moving or still image data recorded on the optical disk 214 of the DVD video camera 200 can be transferred to the data receiving terminal via the LAN 700. At this time, when video data sensed by the DVD video camera 200 are to be stored for a long term, the file management system of the video data on the optical disk 214 loaded to the DVD video camera 200 is virtually developed on the CF card 108 of the camera adapter 100. After that, in response to an operation from the data receiving terminal, the system control unit 101 transmits an execution instruction of finalize processing to the drive I/F 213 via the USB I/F 103, USB cable 110, and USB I/F 211 of the DVD video camera 200.

Upon execution of such processing, while the data receiving terminal accesses video data, the DVD video camera 200 can execute the finalize processing, thus saving the work time.

As described above, according to this embodiment, when the user wants to play back image files sensed by the DVD video camera using the network media player via the LAN, the following processing is executed. The optical disk on which video data are recorded in the DVD-Video format does not undergo finalize processing, and media data on the optical disk of the DVD video camera is transferred to the camera adapter having the DMS function. Then, the file management system of the DVD-Video format which has undergone the virtual finalize processing is developed on the memory of the camera adapter.

In this way, moving or still image files can be quickly played back by the network media player on the LAN.

Even when a write-once, non-rewritable recording media is used as that used for image sensing of the DVD video camera, no finalize processing is executed. When the recording medium still has a large remaining recording capacity, it can be used in recording again.

In this embodiment, the DVD-R or DVD-RW has been exemplified as a disk recording medium. The present invention can be similarly applied to other recording media as long as they require finalize processing. Such disk recording media include, for example, a CD-R, Blu-ray disk, and the like.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-142326 filed on May 29, 2007, which is hereby incorporated by reference herein in its entirety.

What is claimed is:

1. An adapter apparatus, which connects an image sensing apparatus that comprises a disk recording unit for recording data on a disk recording medium which requires finalize processing, and distributes data recorded on the disk recording medium which requires finalize processing of the image sensing apparatus to a data receiving terminal on a network, said apparatus comprising:
 a communication unit configured to communicate with the data receiving terminal on the network;
 a detection unit configured detect connection of the image sensing apparatus;
 a reception unit configured to receive media data, from the image sensing apparatus detected by said detection unit, wherein said media data includes an image file recorded on the disk recording medium which requires finalize processing, of the image sensing apparatus, and management information of the image file;
 a virtual finalize processing unit configured to execute virtual finalize processing by generating a disk image comprising the media data received by said reception unit, a file management system by a computer and a file management system of a DVD-Video format on a memory of the adapter apparatus so that said data receiving terminal can access the disk image, and storing the generated disk image on a memory;
 a transmission unit configured to transmit the media data of the disk image on said memory to the data receiving terminal via said communication unit in response to a request from the data receiving terminal;
 a transmission request reception unit configured to receive a transmission request of an execution instruction of finalize processing of the disk recording medium which requires finalize processing, of the image sensing apparatus, from said data receiving terminal, and
 an execution instruction transmission unit configured to, when the transmission request is received by said transmission request reception unit from said data receiving terminal, transmit the execution instruction of finalize processing of the disk recording medium which requires finalize processing, of the image sensing apparatus, to the image sensing apparatus.

2. The apparatus according to claim 1, wherein said reception unit receives control information for a file management system by a computer, and control information for a file management system of a DVD-Video format from the image sensing apparatus.

3. A method of controlling an adapter apparatus, which connects an image sensing apparatus that comprises a disk recording unit for recording data on a disk recording medium which requires finalize processing, and distributes data recorded on the disk recording medium which requires finalize processing, of the image sensing apparatus to a data receiving terminal on a network, said method comprising:
 a detection step of controlling a detection unit to detect connection of the image sensing apparatus;
 a reception step of controlling a reception unit to receive media data, from the image sensing apparatus detected in the detection step, wherein said media data includes an image file recorded on the disk recording medium which requires finalize processing, of the image sensing apparatus, and management information of the image file;
 a virtual finalize processing step of controlling a finalize processing unit to execute virtual finalize processing by generating a disk image comprising the media data received by said reception unit, a file management system by a computer and a file management system of a DVD-Video format on a memory of the adapter apparatus so that said data receiving terminal can access the disk image, and to store the generated disk image on a memory;
 a transmission step of controlling a transmission unit to transmit the media data of the disk image on the memory to the data receiving terminal in response to a request from the data receiving terminal;
 a transmission request reception step of controlling a transmission request reception unit to receive a transmission request of an execution instruction of finalize processing of the disk recording medium which requires finalize processing, of the image sensing apparatus, from said data receiving terminal, and
 an execution instruction transmission step of controlling an execution instruction transmission unit to, when the transmission request is received by said transmission request reception unit in the transmission request reception step from said data receiving terminal, transmit the execution instruction of finalize processing of the disk recording medium which requires finalize processing, of the image sensing apparatus, to the image sensing apparatus.

4. A computer program stored in a non-transitory computer-readable medium to make a computer execute control of an adapter apparatus, which connects an image sensing apparatus that comprises a disk recording unit for recording data on a disk recording medium which requires finalize processing, and distributes data recorded on the disk recording medium which requires finalize processing, of the image sensing apparatus to a data receiving terminal on a network, said program comprising:
 a detection step of detecting connection of the image sensing apparatus;
 a reception step of receiving media data, from the image sensing apparatus is detected in the detection step, wherein said media data includes an image file recorded on the disk recording medium which requires finalize processing, of the image sensing apparatus, and management information of the image file;
 a virtual finalize processing step of executing virtual finalize processing by generating a disk image comprising the media data received in said receiving step, a file management system by a computer and a file management system of a DVD-Video format on a memory of the adapter apparatus so that said data receiving terminal can access the disk image, and storing the generated disk image on a memory;
 a transmission step of transmitting the media data of the disk image on the memory to the data receiving terminal in response to a request from the data receiving terminal;

a transmission request reception step of receiving a transmission request of an execution instruction of finalize processing of the disk recording medium which requires finalize processing, of the image sensing apparatus, from said data receiving terminal, and an execution instruction transmission step of, when the transmission request is received in said transmission request reception step from said data receiving terminal, transmitting the execution instruction of finalize processing of the disk recording medium which requires finalize processing, of the image sensing apparatus, to the image sensing apparatus.

* * * * *